United States Patent [19]
Jonninen

[11] Patent Number: 5,843,769
[45] Date of Patent: Dec. 1, 1998

[54] DOUBLE STAGE DRUMSHAPED COMPOSTING DEVICE

[75] Inventor: Markku Jonninen, Lahti, Finland

[73] Assignee: Biolan Oy, Finland

[21] Appl. No.: 737,484

[22] PCT Filed: May 18, 1995

[86] PCT No.: PCT/FI95/00264

§ 371 Date: Jan. 17, 1997

§ 102(e) Date: Jan. 17, 1997

[87] PCT Pub. No.: WO95/31419

PCT Pub. Date: Nov. 23, 1995

[30] Foreign Application Priority Data

May 18, 1994 [FI] Finland ................................. 942305

[51] Int. Cl.⁶ .................................................... C12M 3/00
[52] U.S. Cl. .................................. 435/290.3; 435/290.2; 435/290.4
[58] Field of Search ........................... 435/290.2, 290.3, 435/290.4

[56] References Cited

U.S. PATENT DOCUMENTS 2,952,588  9/1960  Rinderer .
4,072,494  2/1978  Gujer ............................................. 71/9
4,633,535  1/1987  Louvo ........................................ 4/449
4,664,527  5/1987  Schuler ................................... 366/141
5,244,804  9/1993  Horkan et al. .
5,254,472  10/1993  Brooks, III et al. ..................... 435/312

FOREIGN PATENT DOCUMENTS 29585  8/1958  Finland .
873760  1/1989  Finland .
891265  9/1990  Finland .
27 08 698  9/1978  Germany .

OTHER PUBLICATIONS

Bibliographic Data.
International Search Report; Intl' Application No. PCT/FI 95/00264; Jun. 9, 1995.

*Primary Examiner*—David A. Redding
*Attorney, Agent, or Firm*—Oppenheimer Poms Smith

[57] ABSTRACT

The invention relates to a two-stage composter drum which includes an inner, rotatably mounted drum and an insulated, stationary, outer drum. Waste is introduced into an opening at one end of the inner drum where it is partially degraded and then discharge through openings at the other end of the inner drum into the annular space provided between the inner and outer drums. The outer surface of the inner drum is provided with means for mixing and moving the composted waste contained within the annular space.

2 Claims, 2 Drawing Sheets

DOUBLE STAGE DRUMSHAPED COMPOSTING DEVICE

The prior art composter drums generally include a rotatable outer housing and the introduction of compostable waste is effected into the interior of this rotatable outer housing. The rotatable outer housing must be isolated from its environment by means of containments for avoiding harmful effects. Another problem is that the composting commences slowly as the fresh waste matter is not brought to a sufficiently high temperature. A temperature sufficient for composting is not reached until in the inner drum in which the final composting is to be carried out.

An object of the invention is to provide an improved two-stage composter, wherein the fresh matter can be instantly brought to a high temperature and the pre-composted mass or pulp can be kept apart from the still non-composted mass. This object is achieved by the invention on the basis of the characterizing features set forth in the annexed claim 1.

One exemplary embodiment of the invention will now be described in more detail with reference made to the accompanying drawings, in which

Figure 1:
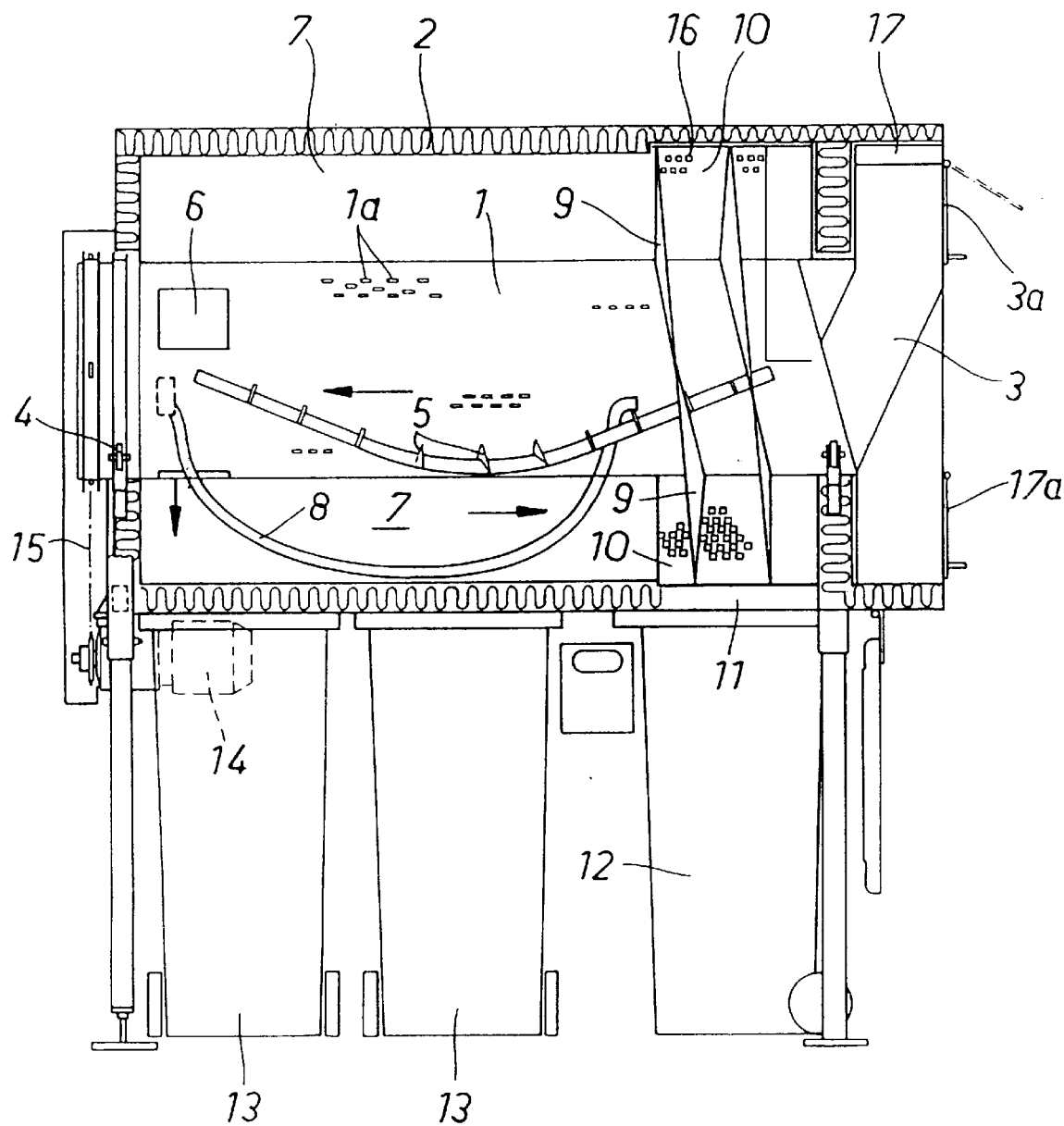
FIG. 1 shows a composter of the invention in axial section.
Figure 2:
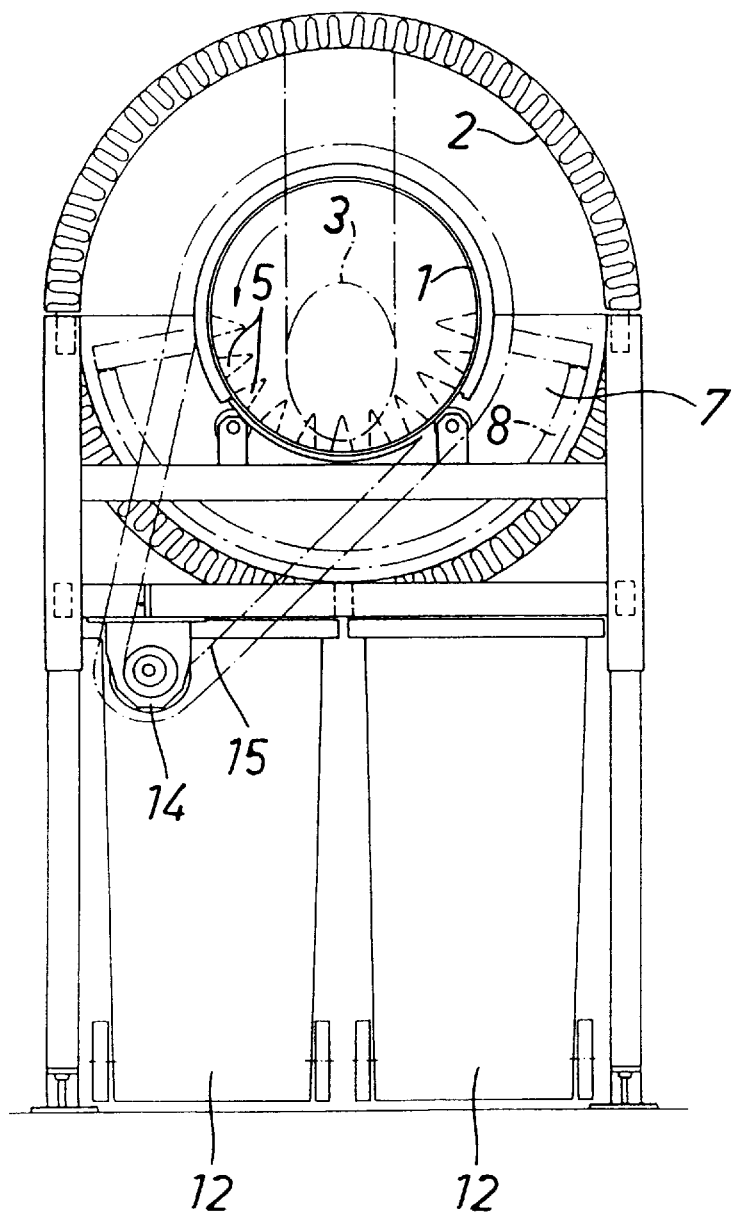
FIG. 2 shows the same composter in cross-section.

An inner drum 1 is rotatably mounted on rollers 4. A motor 14 and a chain drive 15 are used to produce rotational motion, which is activated e.g. with a press button whenever waste is dumped into the composter. Naturally, the rotation can also be effected by means of a hand crank. A trap door 3a is used for dumping in compostable waste by way of a chute 3 from the end of the drum 1. The drum 1 has its inner surface fitted with spirally progressing mixing and feeding elements 5 which include projecting blades for disintegrating and shredding the waste. With each revolution of the drum 1, the mass advances slightly forward.

The drum 1 is surrounded by a fixed thermally insulated outer housing 2 such that between the drum 1 and 2 remains a suitable annular space 7. The other end of the drum 1 is provided with openings 6 whereby the pre-composted mass falls into the annular space 7. The drum 1 has its outer surface fitted with a feed rod 8, running spirally around the drum 1 and extending to the proximity of the inner surface of the outer drum 2. As the drum 1 is rotating, said feed rod 8 carries the mass gradually in the arrow-pointed direction which is opposite to the mass flowing direction in the drum 1.

The end of drum 1 used for the introduction of waste is surrounded by screw blades or wings 9, which are in turn surrounded by a sieve drum 10. From the annular space 7 the mass is gradually fed into the sieve drum 10 by the action of the feed elements 8 and screw wings 9. The sieve drum 10 has a mesh size which is e.g. 15×15 mm. The completely composted mass is delivered through the sieve drum 10 into two dumpsters 12. Other dumpsters 13 are filled e.g. with manually assorted waste products which are not compostable.

The dumping chute 3 may be provided with a container 17 for the introduction of blending agents. The metered addition of blending agents can be adapted to occur automatically every time the drum 1 completes a revolution. The addition of blending agents into the container 17 is effected through a trap door 17a.

The drum 1 is provided with holes 1a for ventilation.

When compostable fresh waste is introduced into the inner drum 1, it is immediately subjected to a sufficiently high temperature for a quick start of composting. On the other hand, the mass pre-composted (hygienized) in the drum 1 is kept in the annular space 7 apart from the still non-composted mass in the drum 1. This assures an effective composting and a high-quality final composture.

I claim:

1. A two-stage composter drum, comprising a first, substantially horizontal drum (1), which is mounted rotatably and provided with internal mixing elements (5) which contribute to the disintegration and mixing of a compost as the drum makes a rotation, and a second, substantially horizontal drum (2) which is non-rotatable, characterized in that said non-rotatable drum (2), which is provided with a fixed thermally insulated housing, surrounds the rotatable inner drum (1), whereby an inlet opening (3) for compostable waste is included in a first end of the rotatable inner drum (1), said rotatable inner drum (1) having a second end which is provided with openings (6) for admitting the pre-composted mass into an annular space (7), provided between said drums (1, 2) and fitted with feed elements (8) fastened to the rotatable inner drum (1) for partially manipulating the mass also in the axial direction of the drums towards discharge elements (9, 10, 11), which are located around said first end of the rotatable inner drum (1) and whereby the finished mass works its way out of the composter.

2. A composter as set forth in claim 1, characterized in that said discharge elements include screw blades or wings (9), mounted around the first end of the rotatable inner drum (1) and surrounded by a sieve drum (10), into which the feed elements (8) included in said annular space (7) and the screw blades or wings (9) deliver composted mass.

* * * * *